United States Patent [19]  
Krings et al.

[11] 3,843,193  
[45] Oct. 22, 1974

[54] WINDSHIELD MOUNTING

[75] Inventors: Hans Krings, Aachen; Hans-Dieter Peetz; Richard Crumbach, both of Richterich, all of Germany

[73] Assignee: Saint-Gobain Industries, Neuilly sur Seine, France

[22] Filed: July 21, 1972

[21] Appl. No.: 273,870

[30] Foreign Application Priority Data  
July 28, 1971 France .............................. 71.27589

[52] U.S. Cl. ............................... 296/84 K, 188/1 C
[51] Int. Cl. ............................................. B60j 1/02
[58] Field of Search ........... 296/84 R, 84 K; 52/208; 188/1 C

[56] References Cited  
UNITED STATES PATENTS  
2,200,936   5/1940   Ruesch ............................. 296/84 K
2,220,787   11/1940  Hooppaw .......................... 296/84 K
2,907,602   10/1959  Lagerling ......................... 296/84 K
3,081,127   3/1963   Orowan ............................ 296/84 K FOREIGN PATENTS OR APPLICATIONS  
1,512,378   1/1968   France ............................ 296/84 K
450,938     5/1968   Switzerland ...................... 296/84 K Primary Examiner—Robert J. Spar  
Assistant Examiner—Leslie J. Paperner  
Attorney, Agent, or Firm—Pennie & Edmonds

[57] ABSTRACT

Mounting for the windshield pane of a vehicle wherein the pane is released in response to shock incident thereon and outward movement following release is restrained and limited to a certain distance or displacement to absorb at least a portion of the shock energy.

6 Claims, 8 Drawing Figures

WINDSHIELD MOUNTING

BACKGROUND OF THE INVENTION

This invention relates to deformable means for mounting a windshield pane in the frame of the body of a vehicle such as an automobile or airplane. When in event of shock such as may be caused by an occupant of the vehicle being thrown violently against the pane, as the result of a collision, the force exerted upon the pane exceeds a certain value, the pane is thrust from its mounting and is thereafter restrained and limited against outward movement from its initial emplace position, to a certain distance or displacement as determined by deformable portions of the frame or mounting.

A windshield mounting formed of rubber and having the features and mode of operation as just described, is disclosed in German patent number 916,501. The mounting is composed of two parts, one for the pane and the other fixed with the vehicle body. The two parts or rings are united by an elastic band. In event an occupant of the vehicle is thrown against the windshield, as in a collision, the two rings separate. The elastic band, which is of the same material as the two separable rings of the mounting, unites the ring in such a way that the pane can move forwardly a certain distance but is retained or restrained by the elastic band.

The yielding features of the aforesaid known type of windshield mounting are a serious defect because they are not completely reliable in event a passenger or occupant in the vehicle is accidentally and forcefully thrown against the windshield. The conditions required for efficient operation such as will result in absorbing the applied force or energy is that the resistance must be maintained for a sufficient distance, that is, a braking or retarding distance. It is also necessary that the deceleration be retained at a value low enough to avoid irreparable damage to the body of the passenger or occupant. Those requirements are not satisfied by known mountings of the type just discussed.

Moreover it is absolutely necessary that the shock-induced release force of the flexible mounting be of sufficiently low value as to avoid irreparable injury when effected by the striking of the windshield by an occupant's head. In the case of a vehicle traveling at 50 km/hr, the deceleration of an object striking the windshield as the result of a collision, may have a value of from 15 to 20 g, without however, effecting the desired release of the pane.

Another important drawback of prior art flexible mountings of the type under discussion, is that the amount of energy which can be absorbed by deformation of the mounting, depends to a large extent upon extraneous conditions such as the age of the rubber in the mounting and the existing ambient temperature. This is because of the fact that the resiliency of the rubber, usually of synthetic material, deteriorates with time. Furthermore, certain physical properties such as elasticity or aptitude for yielding deformation, resistance to abrasion, etc., depend to a certain extent upon ambient temperature values. Therefore it is not possible to produce a windshield mounting of the aforesaid prior art type, capable of absorbing a known necessary amount of energy in event of a collision.

SUMMARY OF THE INVENTION

The present invention overcomes and obviates the disadvantages of known mountings by providing a deformable mounting for windshield panes, having a value of plastic deformation reduced to a value of resistance insufficient for penetration. The mounting absorbs a certain amount of kinetic energy engendered by the shock of impact, in accordance with conditions which are not excessively dangerous to the body of the occupant.

The advantages of the present invention are attained by constructing the deformable parts of the mounting to have properties and dimensions such that the windshield pane itself is capable of absorbing kinematic energy of the order of 70 kgm, resulting from a shock of impact by a body traveling at 50 km/hr, over a braking distance of about 25 cm. The flexible or yielding parts of the mounting are constructed of deformable material having good resistance to ageing and mechanical properties which are practically independent of temperature values in the range $-30°$ to $+80°$ C.

In determining the dimensions and form of the novel flexible mounting there is taken into consideration the energy to be absorbed by the known deformation of the windshield pane caused by the impact, without penetration thereof. Such penetration must be avoided at all events because of the wounds which can be caused by the sharp or jagged edges of the broken pane.

Known safety glass composed of two sheets of glass adhesively secured together by an interlayer of polyvinyl-butyral having a thickness of 0.76 mm. can, without penetration, absorb a relatively large amount of energy. Thus under conditions of use of a sheet or pane of safety glass as aforesaid, the residual energy to be absorbed by the mounting of the pane is materially reduced. In the use of panes of good energy-absorbing property, the force of release can be correspondingly great and may occur over a relatively long period of time after the initial impact.

The braking distance available in windshield pane mountings is relatively small - say 5 to 10 cm. The construction is such that the time between initial release of the pane and its maximum forward or outward extension is of the order of 10 to 15 milliseconds after impact. Windshields of safety glass such as those composed of a sheet of glass adhesively secured face to face to a sheet of synthetic plastic are notably less deformable and thus the forces of deceleration with such panes, attain values which are intolerably high when the sheet of plastic itself is securely fixed in its mounting ring or bezel. The present invention makes it possible to use such a windshield with a deformable mounting which may be detached about 3 milliseconds after impact, and having a braking distance or displacement of from 15 to 20 cm.

According to a first embodiment of the invention the energy-absorbing parts of the mounting are formed of metal having the important capability of plastic or yielding deformation afforded by an appropriate form or shape of the parts. For instance, the parts may be shaped or curved or folded clips or hooks which, in event of overloading may straighten out and thereby afford the desired braking resistance and distance. In another embodiment the pane may be secured in place by plates or straps which are provided with perforations of a number and arrangement such that they stretch or elongate under abnormal stress.

The parts which absorb the energy of impact may advantageously be associated with a rubber mounting frame, that is, they may be incorporated into the rubber of the frame, provided however that this permits the free or unfettered deformation of the mounting parts. It is possible to position those parts in the material of the mounting frame of the windshield pane.

According to another embodiment, the energy-absorbing parts may be of textile materials located without or within the rubber mounting frame or bezel of the pane. Other ways of attaching or relating the energy-absorbing parts to or with the frame are possible. For example, the absorption of energy may be effected by the progressive rupture of textile filaments, threads or stitching. In particular the energy absorption may be effected by fabrics or textiles of synthetic plastics or glass fibers.

In order to afford the necessary braking distance, it is advisable to so arrange the textiles that groups of filaments are progressively tensioned and ruptured during extension of the energy-absorbing parts. Thus there is a continuous braking restraint during and along the entire distance of extension.

The energy-absorbing parts of the windshield assembly may, in accordance with the invention, be used in those constructions wherein the pane is not mounted in a rubber bezel or ring but, to the contrary, in accordance with a practice common at the present time, is simply adhesively attached to its mounting frame. Of course the adhesive attachment should be such as to be readily broken in case of collision, and the braking effect on the body of the occupant of the vehicle is, in such mountings, mainly effected by the energy-absorbing parts characterizing the invention.

Other features, characteristics and objects of the invention will become apparent to those skilled in the art, from a study of the following detailed description, in connection with the accompanying drawing.

BRIEF DESCRIPTION OF THE DRAWING

In FIG. 1 the windshield pane is of the so-called "safety" type composed of glass sheets 1 and 3 with an interlayer 2 of polyvinyl butyral about 0.76 mm thick. The pane is mounted in a frame 5 by means of a rubber ring or bezel 4 which has a weathertight joint association with the pane. As shown, frame 5 which may be of metal, has a fold 6 embedded in the material of ring 4. This construction enables the pane and ring to be detached as a unit from frame 5 in response to an impact force of certain and high value.

Figure 1:
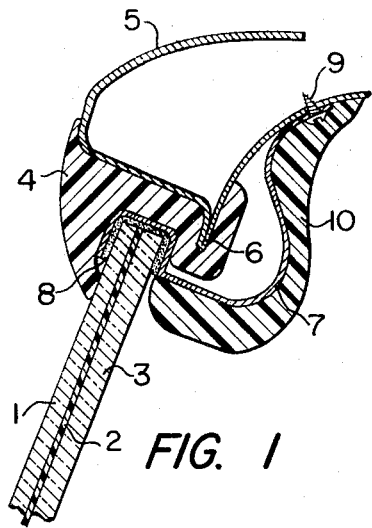
FIG. 1 is a transverse section through an edge portion of a first embodiment wherein a series of curved metallic energy-absorbing hooks or clips are spaced along the edge of the windshield pane.

Clips or hooks 7 are spaced at regular intervals along the edge of the windshield. Each consists of a curved metal strap anchored at one end as at 9, to frame 5, and having its other end in the form of a channel fitting over the adjacent edge of the pane, within a groove in ring 4, and firmly secured to the pane by adhesive 8.

Ring 4 makes a weather-tight seal over and about the contiguous end of each clip. The length of the curved portion of each clip is such that, when straightened out or extended under the force of a violent impact, the pane may move forwardly about 10 cm. while remaining attached to frame 5. The metal clips 7 are dimensioned and spaced in accordance with the requirements of each particular installation and are based upon the material and construction of the pane itself and the angle at which it is set with respect to the vehicle. Each clip 7 has secured to it a covering 10 of soft rubber, for the purpose of preventing wounding of the occupant, otherwise possible because of violent contact with the metal of the clip.

In accordance with extraneous conditions and with the use of certain metals, it is sometimes advisable to replace the relatively narrow clips with a continuous strip of metal curved like item 7, FIG. 1, and forming a sort of frame or border in surrounding relation with the windshield.

Figure 2:
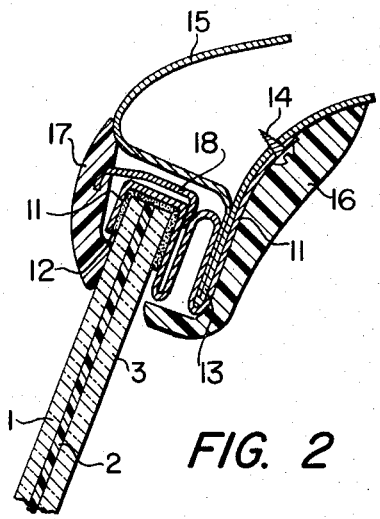
FIG. 2 is a transverse section showing a variation from FIG. 1, of the mounting for a windshield pane.

In the construction of FIG. 2, a windshield pane 1, 2, 3 of the same type as in FIG. 1, is held in place by metal clips 11 each of which is fixed at one end, at 14, to the metal of the vehicle body or frame 15. The central part of each clip is folded upon itself a number of times as shown. Its other end is formed as a channel extending over and about the contiguous edge or peripheral portion of the pane and secured thereto by adhesive 12. A folded portion 13 of the vehicle body extends, as shown, into the initial fold of clip 11.

Inside the vehicle a rubber strip 16 is secured by adhesive, as a safety measure, to and over the otherwise exposed metal of the clips. Outside, a protective and decorative rubber strip or band 17 has embedded therein one end of each of a number of hooks 18 and which extend over the edge of the pane to be firmly but releasably held by a bent end each projecting into and between a fold of the clip 11.

Figure 3:
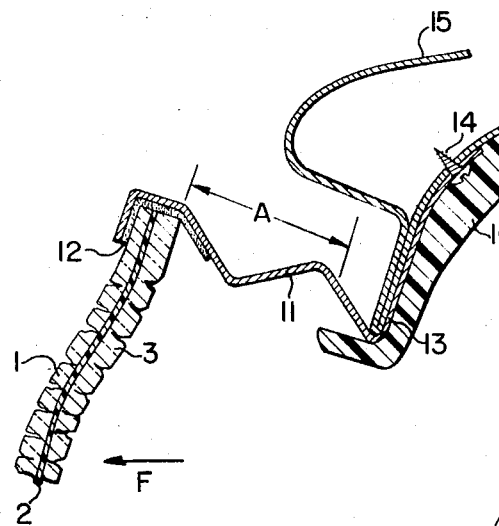
FIG. 3 is a transverse sectional view showing the retarding action of the construction of FIG. 2, in response to a shock or collision.

Turning to FIG. 3, when, as the result of a collision, for example, the head of an occupant of the vehicle violently contacts the windshield in the direction indicated by arrow F, the flexible plastic interlayer 2 of the windshield is deformed in the forward direction and thus absorbs a certain large part of the kinetic energy of impact. The shattered parts of sheets 1 and 3 remain attached to interlayer 2.

Similarly under effect of the impact, the pane is forced forwardly a distance A and in so moving, extends or expands the clips 11 in the manner shown, FIG. 3. The extension thus effected absorbs and dissipates the remainder of the kinetic energy of impact. As will be clear, the amount of kinetic energy absorbed by the conjoint extension of clips 11 may be varied by proper selection of the material or metal of which they are constructed, their form, and/or dimensions such as thickness and width.

It is important to note that here the pane is not thrust from its mounting, and the clips do not begin to extend or stretch, until the pane is substantially fully flexed as in FIG. 3 and has preliminarily absorbed a large and initial part of the energy of impact.

Figure 4:
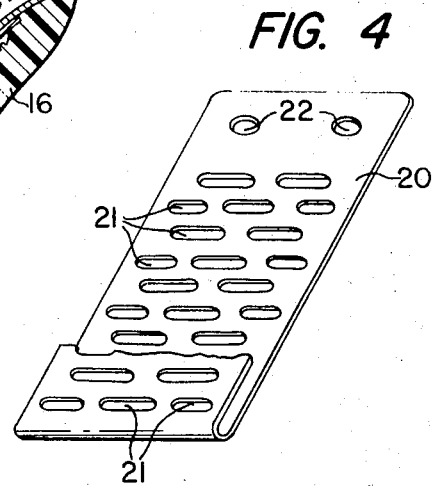
FIG. 4 shows a particularly useful construction for the clips employed in FIG. 3.

FIG. 4 shows how the strap 20 of metal or like material of the clips, may be selectively weakened by the formation therein of a regularly-arranged multiplicity of elongated holes 21, arranged in rows with the holes of each row in staggered relation to those of contiguous rows. By varying the number and size of the holes, and their spacing, a clip of given dimensions may be made to elongate to a desired extent under any selected impact force component. Holes 22 receive the screws 14 by which each clip is fixed to the body or framework of the vehicle.

Figure 5:
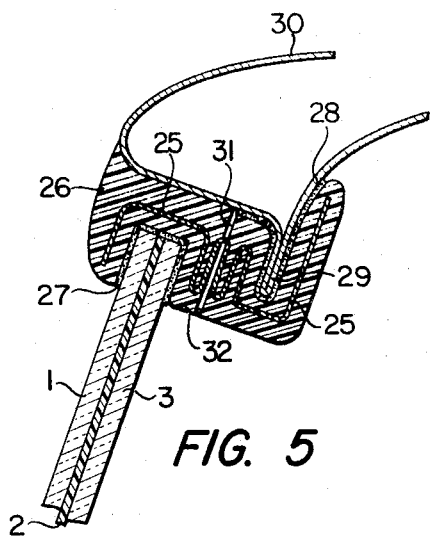
FIG. 5 is a transverse section through another embodiment of the invention.

FIG. 5 shows a variation of the novel construction of windshield mounting wherein the pane itself may be of the same laminated form as in FIGS. 1 and 2. Here, a folded metallic part or clip 25 is embedded within a specially-shaped rubber ring or bezel 26 which itself mounts the windshield pane by means of a channel formed therein. Adhesive 27 secures the edge of the pane within the channel and forms a weather-tight seal therewith. The bezel is shaped to have a smooth fit against the metal body or frame portion 30 and is attached thereto by a layer of adhesive 28. It is noted that interiorly, ring 26 extends upwardly in a protective continuity, about the fold in the metal of body portion 30.

In order to assure proper operation in event of collision, ring 26 is formed into two parts with a weakened interconnection or hiatus as indicated at 31, leaving only a solid or integral interconnection 32. Adhesive layer 28 extends forwardly up to but not past this weakened interface. Thus it is assured that an impact of sufficient force will cause separation of the ring parts at the hiatus while, however, under normal operation, the metal of ring 25 firmly connects the two parts aforesaid.

In case of impact of sufficient force or intensity against the windshield pane, it is thrust forwardly as in FIG. 3, the parts of ring 26 separating in the vicinity of hiatus 31. The folded metal or strap 25 expands while absorbing the residual kinetic energy of the impact. The elongation is made possible because of yielding of the rubber of ring 26 which also adds a degree of restraint. The pane remains with its edge encased in the channel of the forward portion of ring 26. The metal of strap 25 may be pierced with holes as in FIG. 4. The construction described may embody a number of discrete straps like 25, spaced at selected intervals in and along ring 26. Or it may consist of a sheet or strip folded as shown and extending continuously in and along the ring, and embedded therein.

Figure 6:
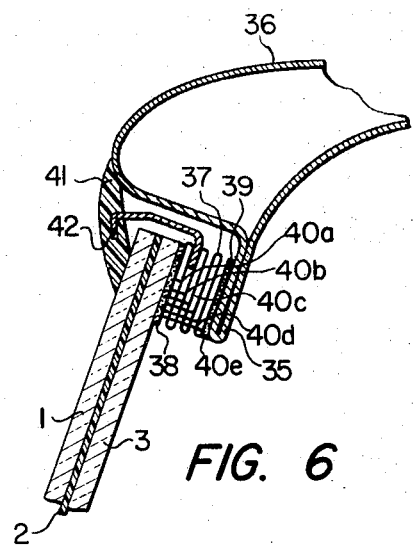
FIG. 6 is a transverse section through a windshield mounting, using pleated textile as the extensible, energy-absorbing element.

FIG. 6 shows another form or embodiment of the invention, mounting a pane of safety glass as in FIGS. 1, 2 etc. The vehicle body portion 36 is folded back upon itself as at 35, to form an overlap about the edge of the pane. The extensible part 37 is of folded or pleated textile disposed between fold 35 and the edge of the pane. The edges are adhesively secured at 38 and 39 to the pane and the fold 35, respectively.

The folds or pleats of item 37 are secured together in a special way as shown by stitching 40a, 40b, etc., through 40e. Thus the first or forward fold is stitched together by a row of stitches indicated at 40a. Next, a second row of stitching 40b secures together the forward fold and first layer of the second fold. A third row 40c secures together the four layers of the first and second folds, and so on up to the sixth and final layer of the three folds shown, as at 40d and 40e.

Thus in event of a violent impact against the windshield pane the rows of stitching, beginning with row 40e, are successively torn asunder thus permitting the pane to move forwardly to the extent necessary to absorb the residual kinetic energy of impact. The number of pleats or folds of textile part 37 may be varied as desired or found necessary, within practicable limits. A weather tight seal between the body part 36 and the pane, is effected by a rubber ring or bezel 41 held in place by a metallic band or clips 42 embedded at one edge within the ring and having the other bent edge interposed between pleats of the textile 37, as clearly shown.

Figure 7:
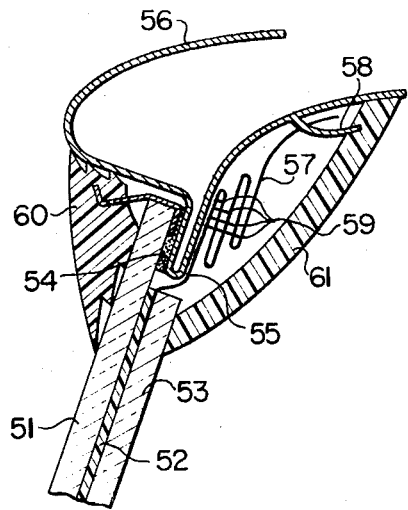
FIG. 7 shows a form of the invention generally corresponding to FIG. 6 but embodying a windshield pane of a construction different from that of FIGS. 1 to 6.

FIG. 7 shows a mounting embodying the invention, for a pane formed of an outer sheet 51 of glass, secured to an inner sheet 53 of plastic material, by means of an interlayer 52 of adhesive, in a manner known in the art. The sheet 51 is larger than sheet 53 so that its edge extends outwardly beyond that of sheet 53, as there shown. The over-extending edge of sheet 51 is secured by adhesive 54 to and along the forward surface of an abutment formed by a fold 55 in the metal of the vehicle body portion 56. The construction shown has the advantage that the glass sheet is detached from its mounting by separation of its adhesively-attached edge as the result of flexure of the pane due to energy engendered by a shock exceeding a permissible limit. This form of the invention is particularly valuable when the windshield pane is to be rapidly ejected or separated from its mounting immediately upon impact. Then, to assure the proper braking distance of movement of the pane and to make certain that it does not separate completely from the vehicle and thus leave its opening in the frame unobstructed, a band of textile 57 having several folds or pleats and stitched together in the manner shown on, and as previously explained in connection with FIG. 6, has one edge attached to and along an edge of the pane, as by insertion into the layer of adhesive 52, to become firmly united therewith and thus, with plastic sheet 53. The other edge of the textile band is attached to the vehicle body by hooks 58 each having one end embedded in the protective elastomer sealing strip 61.

As shown, each row of stitching 59 passes through a number of folds or pleats of the textile, which is one less than the next lower row as they are viewed upon FIG. 7. Thus in response to a shock of certain minimum intensity of rows of stitching are sequentially torn apart with a consequent absorption of kinetic energy throughout a certain forward extension or travel of the pane. A weather-tight seal is provided by rubber ring or band 60 located externally of the windshield as shown, and held in place by a series of hooks 62a spaced at regular intervals along the ring, each having one end embedded in the material of the ring and the other clipped over the contiguous edge of glass sheet 51 forming the forward layer of the pane.

Figure 8:
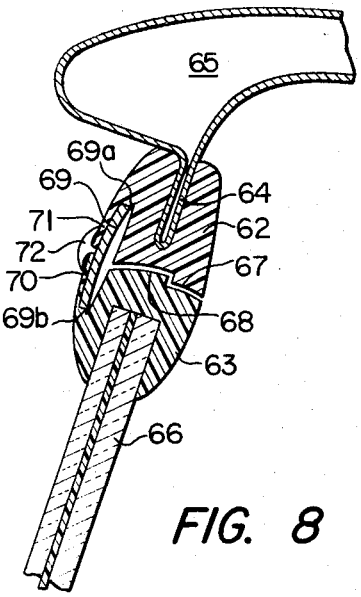
FIG. 8 is a further embodiment wherein a rubber mounting for the pane is made of two interfitting and essentially discrete rings interconnected by a metallic part.

At FIG. 8 there is depicted another embodiment wherein the windshield pane is mounted by a two-part rubber ring. The radially outer part 62 is grooved to receive and encompass the fold 64 in the metal of body portion 65 of the vehicle. The inner part 63 is grooved to encompass the edge of the pane 66. The two parts 62 and 63 are releasably secured together by shaped interfitting or complementary surfaces 67, 68 which slide relatively under impact of intensity above a certain minimum, and thus effect the desired absorption of energy.

In order to releasably unite the ring parts 62, 63, a deformable band 69 which may be metallic, has its two edges 69a and 69b embedded in and vulcanized to the respective parts, to extend across and interconnect their forward meeting edges or lips 70, 71. The gap or hiatus between those two edges may be concealed by a decorative strip 72 adhesively attached to the ring parts. In event of shock the deformation of the mounting results in the application of torsion to band 69 to thus provide the required braking resistance.

As numerous modifications effecting variations and changes in size, shape, number of parts and materials, will readily occur to those skilled in the art, after a study of the foregoing description, the disclosure is to be taken in an illustrative rather than a limiting sense.

We claim:

1. A windshield mounting for releasably retaining a pane in an opening of a vehicle body, said mounting comprising first means releasably retaining the pane in the opening, and second means operable to release the pane in response to impact effective thereon, said second means including a strip of textile longitudinally folded a predetermined number of times to form layers, and a plurality of rows of stitching in and longitudinally along the strip, each said row extending through and interconnecting a number of said layers one less than the number connected by the next subjacent row, and means attaching the edges of the strip to and along the periphery of the opening in the vehicle body, and the periphery of the pane, respectively.

2. The mounting of claim 1, a rubber bezel exteriorly of said pane, clip means releasably securing said bezel with its edges in contact with the body of the vehicle and the border of the pane, respectively, said clip means comprising a strap having one end embedded in the material of the bezel and its other end extending into and between two contiguous layers of said strip to be gripped therebetween.

3. The mounting of claim 1, the vehicle body having a rigid abutment portion behind and extending along the border of the pane, said attaching means comprising adhesive connecting said one edge of the strip to and along said abutment, and its other edge to and along the border of the pane.

4. A mounting according to claim 1 wherein said pane comprises first and second sheets adhesively secured together in superposed relation, one edge of said strip extending into and being sealed between the borders of said sheets, and means attaching the other edge of said strip to and along the border of the body opening.

5. The mounting of claim 4, said first sheet extending beyond the borders of said second sheet to form a projecting rim, a sealing strip extending exteriorly of the pane, and clip means having one end embedded in the material of said sealing strip, and its other end extending over and about said projecting rim, to thereby releasably hold said sealing strip in contact with the vehicle body and border of the pane.

6. The mounting of claim 5, the body having a rigid abutment behind and extending along the border of the pane, and means detachably attaching said projecting rim to said abutment.

* * * * *

UNITED STATES PATENT OFFICE
CERTIFICATE OF CORRECTION

Patent No. 3,843,193  Dated October 22, 1974

Inventor(s) Hans Krings et al.

It is certified that error appears in the above-identified patent and that said Letters Patent are hereby corrected as shown below:

Column 8, line 6, after "claim 1," insert --further including--.

Signed and sealed this 18th day of March 1975.

(SEAL)
Attest:

RUTH C. MASON
Attesting Officer

C. MARSHALL DANN
Commissioner of Patents
and Trademarks